United States Patent
Le Clinche

(10) Patent No.: US 6,767,034 B2
(45) Date of Patent: Jul. 27, 2004

(54) DEVICE FOR CONNECTING AN END PIECE TO AN ELEMENT

(75) Inventor: Pascal Le Clinche, Rennes (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/258,284

(22) PCT Filed: May 3, 2001

(86) PCT No.: PCT/FR01/01346

§ 371 (c)(1),
(2), (4) Date: Oct. 23, 2002

(87) PCT Pub. No.: WO01/86189

PCT Pub. Date: Nov. 15, 2001

(65) Prior Publication Data

US 2003/0098583 A1 May 29, 2003

(30) Foreign Application Priority Data

May 10, 2000 (FR) .......................................... 00/05919

(51) Int. Cl.[7] ................................................ F16L 37/00
(52) U.S. Cl. ...................... 285/319; 285/308; 285/313; 285/314
(58) Field of Search ................................. 285/307, 314, 285/317, 319, 313, 308

(56) References Cited

U.S. PATENT DOCUMENTS

| | | | |
|---|---|---|---|
| 2,727,759 A | | 12/1955 | Elliott |
| 2,952,482 A | * | 9/1960 | Torres ........................ 285/313 |
| 4,913,467 A | | 4/1990 | Washizu |
| 5,067,754 A | * | 11/1991 | Bartholomew ............... 285/319 |
| 5,069,489 A | * | 12/1991 | Bartholomew ............... 285/319 |
| 5,226,680 A | * | 7/1993 | Bahner et al. ................ 285/93 |
| 5,320,390 A | * | 6/1994 | Kodama et al. ............ 285/308 |
| 5,378,025 A | | 1/1995 | Szabo |
| 5,415,825 A | | 5/1995 | Sellers |
| 5,542,717 A | * | 8/1996 | Rea et al. .................... 285/319 |
| 5,697,652 A | * | 12/1997 | Nishikawa ................... 285/314 |
| 6,338,506 B1 | * | 1/2002 | Kubota et al. ............... 285/319 |

FOREIGN PATENT DOCUMENTS

| | | | | |
|---|---|---|---|---|
| FR | 2590648 | * | 5/1987 | ................. 285/308 |
| GB | 2217417 | | 10/1989 | |

* cited by examiner

*Primary Examiner*—David Bochna
(74) *Attorney, Agent, or Firm*—Young & Thompson

(57) ABSTRACT

A coupling device for coupling an endpiece to a member, comprises a female portion for receiving the endpiece, and a bushing mounted to slide in the female portion and possessing one end projecting from the female portion and provided with at least one blocking member for blocking the bushing either in a pushed-in, locking position or pulled-back, unlocking position, and an opposite end provided both with front abutment elements for coming into abutment with an annular bead of the endpiece, and rear abutment elements for coming into abutment with the bead so that when the bushing is in its unlocking position, the rear abutment elements are movable by the annular abutment between a position in which they project towards the inside of the bushing and a retracted position, and when the bushing is in its locking position, the rear abutment elements are held in their projecting position.

11 Claims, 3 Drawing Sheets

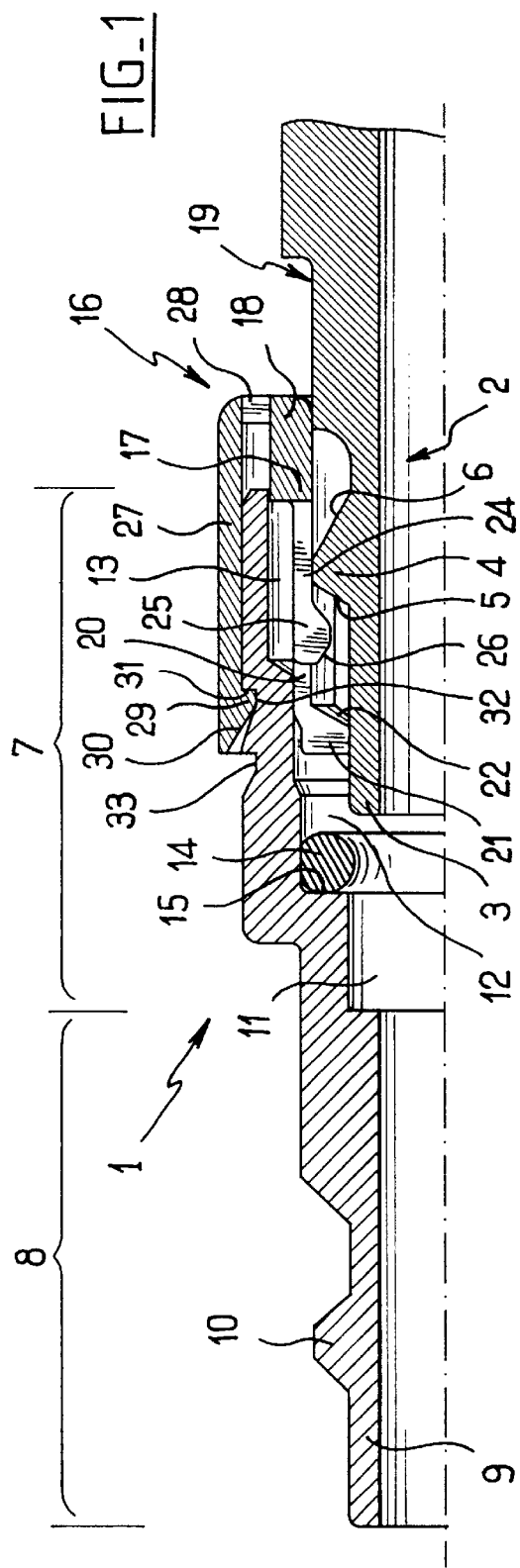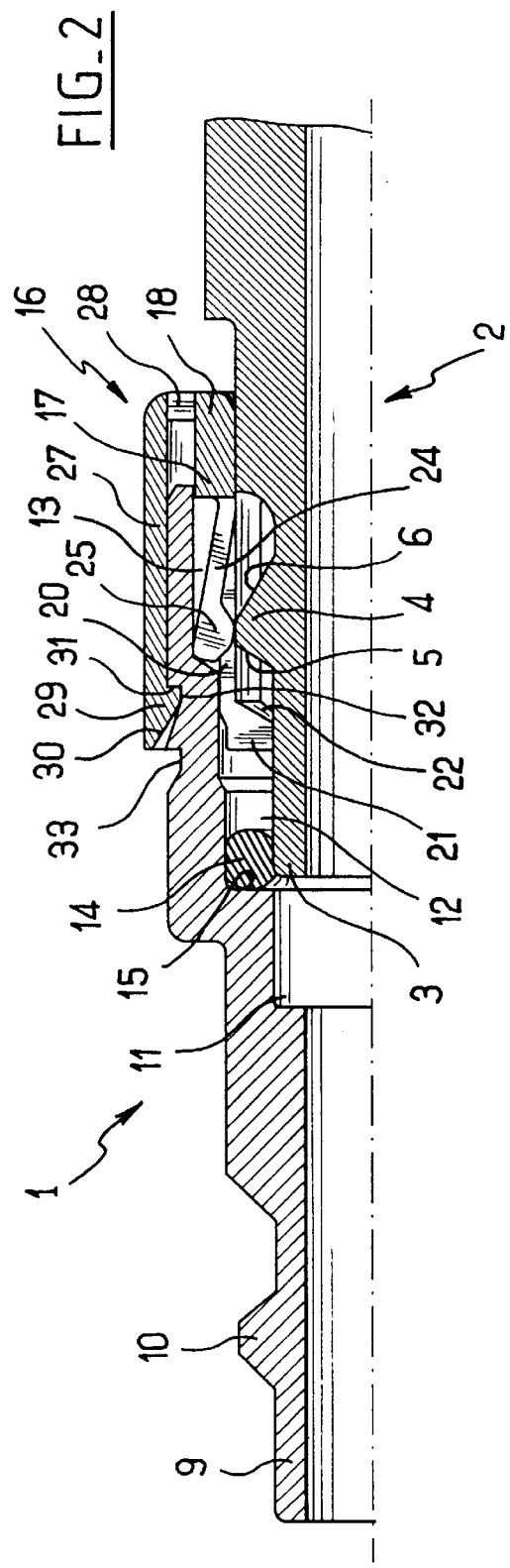

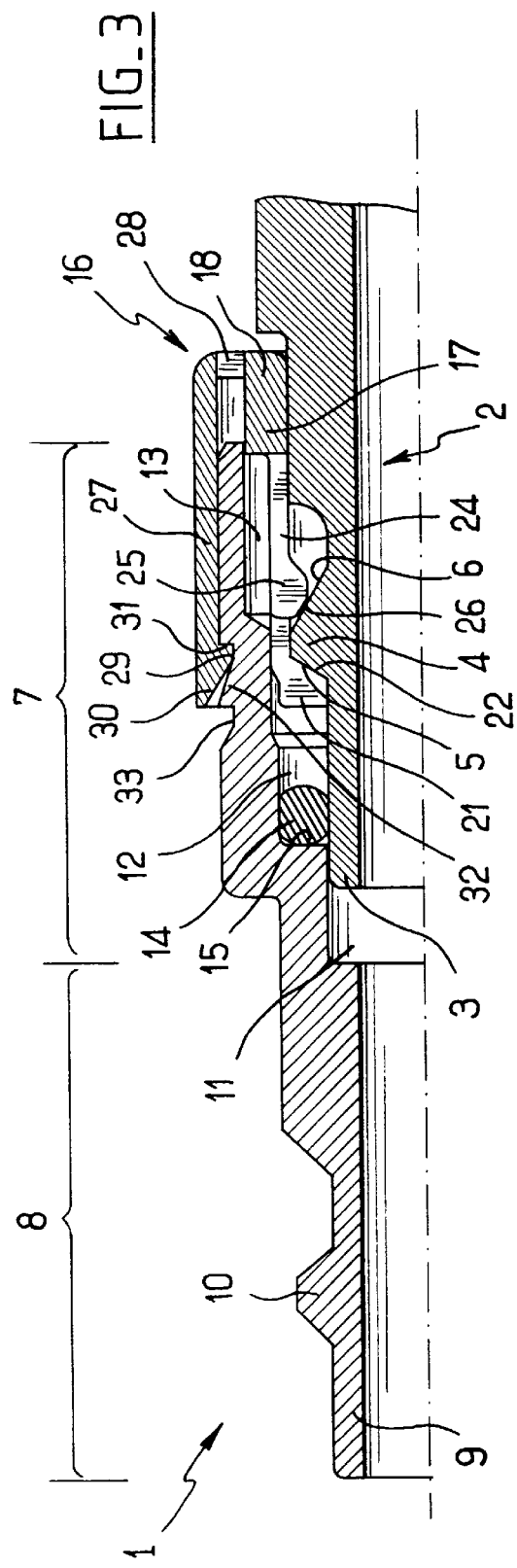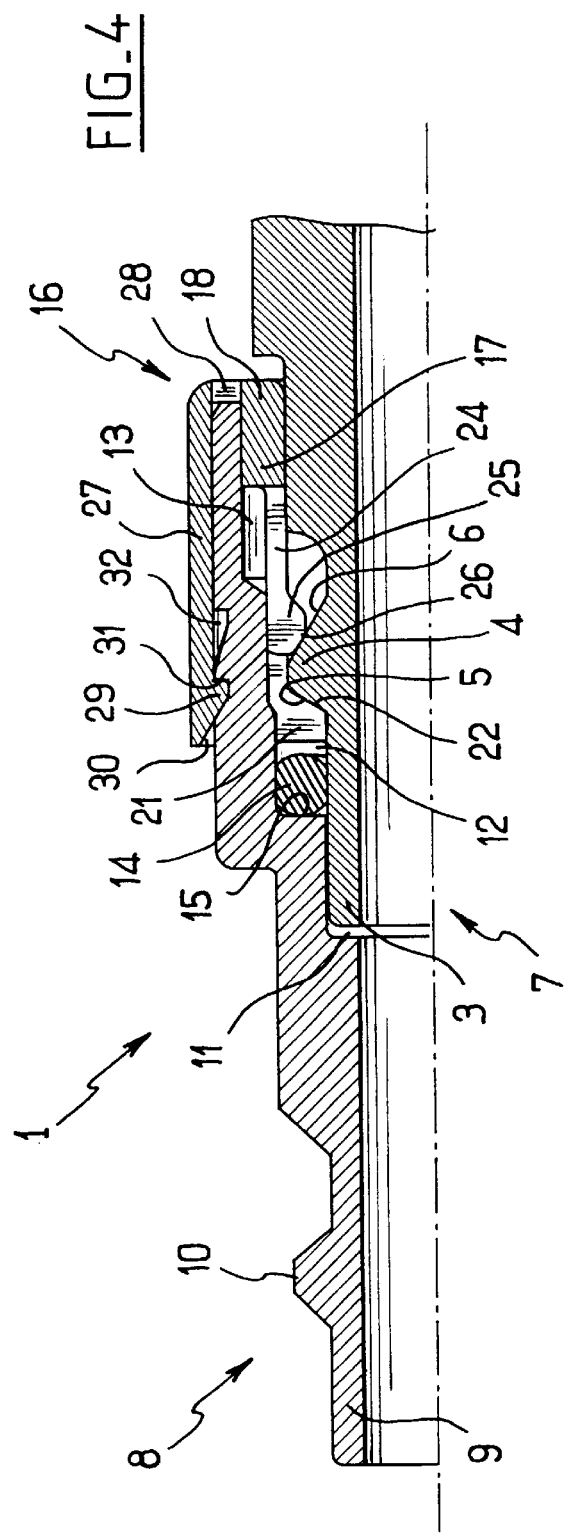

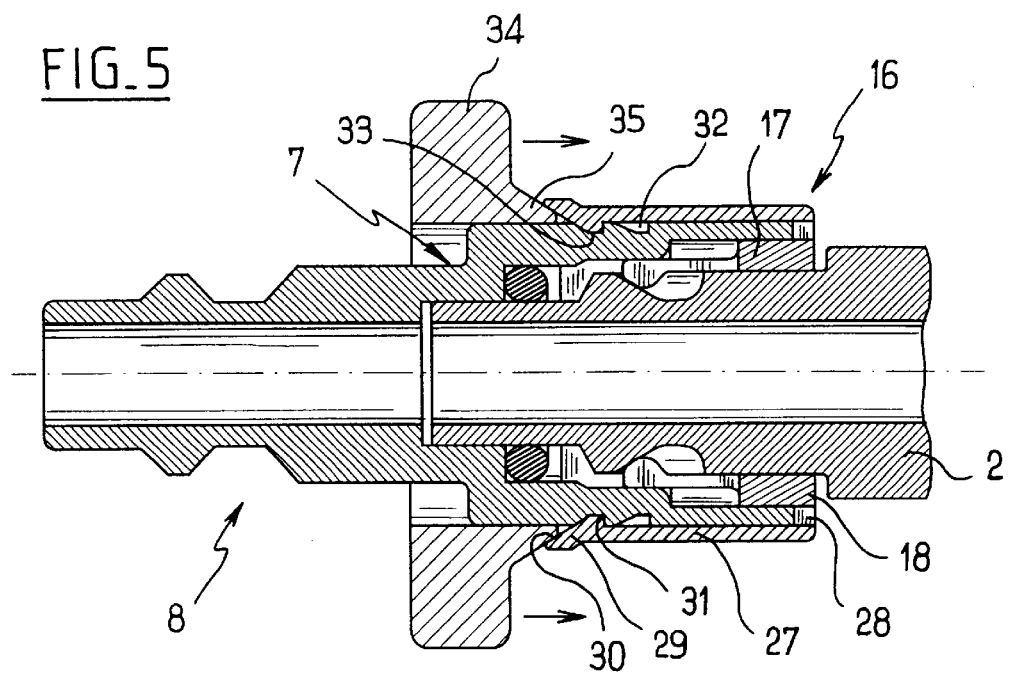
FIG_5
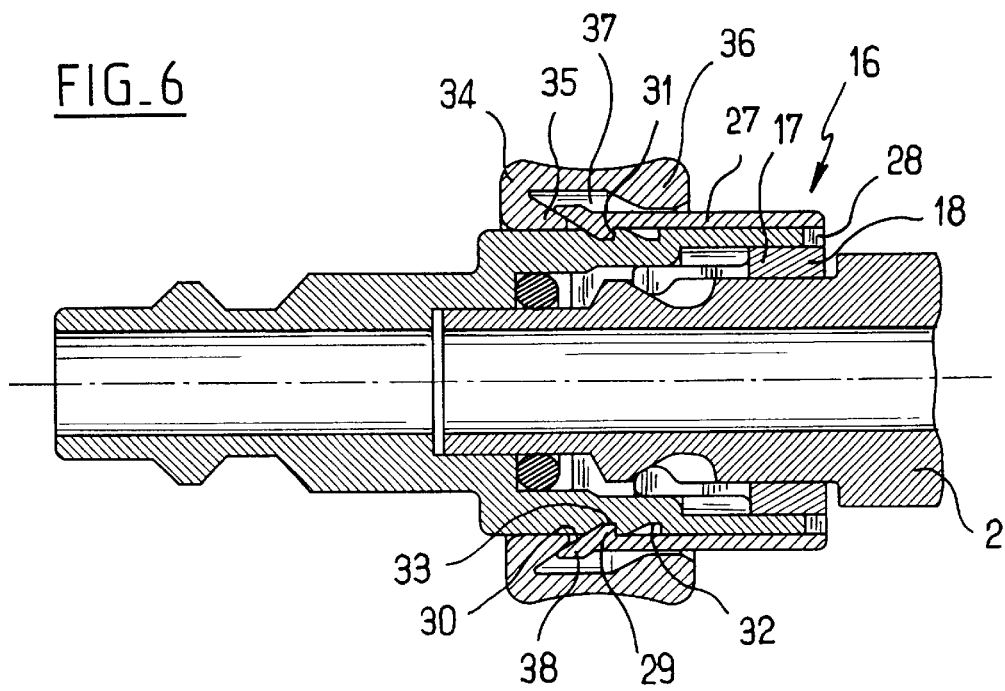
FIG_6

DEVICE FOR CONNECTING AN END PIECE TO AN ELEMENT

The present invention relates to a coupling device usable in particular in circuits for transporting fluids under pressure in order to provide a quick coupling between two circuit elements such as two pipes or such as a pipe and a member that delivers or receives fluid.

BACKGROUND OF THE INVENTION

Ball couplers are known comprising a male tubular endpiece having an annular external bead and a female tubular endpiece for receiving the male tubular endpiece, the endpieces being designed for being associated with respective elements of the circuit. The male endpiece is held in the female endpiece by means of balls which are pressed by locking means into abutment behind the annular bead.

In general, the locking means comprise a ball-holding cage mounted via one end on the female endpiece to extend beyond said endpiece, and a ring mounted on the holding cage to move axially between first and second positions. The ring has inside camming surfaces arranged in such a manner that when the ring is in its first position, the balls are held projecting from the inside of the holding cage so as to retain the annular bead of the male endpiece, and when the ring is in its second position, the balls are released radially and can be moved into a retracted position away from their projecting position by co-operating with the annular bead, so as to enable the annular bead to be disengaged and the male endpiece to be removed.

Such ball couplers are in widespread use in industry because of the speed with which they allow coupling to be implemented. Nevertheless, those couplers are of complex structure involving a large number of parts. As a result, as well as being heavy, the various components of the coupler are lengthy to assemble, and manufacture thereof is relatively expensive in general terms.

There also exist on the market various types of couplers that differ from one another, e.g. in terms of the length of the male endpiece or in terms of the shape of the annular bead. Thus, in some cases, in order to maintain existing circuits, it is necessary to have as many different types of coupler as there are different types installed on the circuits. Given the price of these couplers, that leads to relatively high cost for maintenance, storage, and stock management.

OBJECTS AND SUMMARY OF THE INVENTION

It would therefore be advantageous to have a coupling device that is simple in structure, easy to manufacture, and inexpensive.

For this purpose, the invention provides a device for coupling an endpiece to a member, the coupling device comprising a female portion for receiving the endpiece, a bushing mounted to slide in the female portion and possessing one end projecting from the female portion, which end is provided on the outside with at least one blocking means co-operating with the female portion to block the bushing either in a pushed-in, locking position or else in a pulled-back, unlocking position, and an opposite end provided both with front abutment means for coming into abutment with an annular bead of the endpiece, which front abutment means project radially inwards from the bushing, and rear abutment means for coming into abutment with the bead so that when the bushing is in its unlocking position, the rear abutment means are in register with a first chamber of the female portion so as to be movable by the annular abutment between a position in which they project towards the inside of the bushing and a retracted position, and when the bushing is in its locking position, the rear abutment means are received in a second chamber of the female portion having a wall that holds the rear abutment means in their projecting position.

As a result, the coupling device is simple in structure, making use of a small number of parts while nevertheless achieving coupling that is similar in effectiveness to the coupling provided by ball couplings, in particular.

In a preferred embodiment:
the rear abutment means comprise at least one deformable tab having one end secured to the bushing and an opposite end provided with a lug, the tab being deformable between a rest state in which the lug projects towards the inside of the bushing, and a deformed state in which the lug is retracted;
the front abutment means comprise at least one rigid tab having one end secured to the bushing and an opposite end provided with a shoulder projecting towards the inside of the bushing to constitute an abutment for the annular bead of the endpiece; and
the blocking means comprise at least one elastically deformable catch having one end secured to the bushing and an opposite end provided with a projection, and the female portion has an outside surface presenting at least two setbacks in axial succession for receiving said projection.

Thus, the bushing, the front and rear abutment means, and the blocking means can be made as a single piece.

Advantageously, the bushing is mounted in removable manner on the female portion.

This makes it possible to provide coupling devices in which the female portion is adapted to receive a plurality of male endpieces, and to provide interchangeable bushings each adapted to a particular type of male endpiece. Inexpensive adaptors can thus be made for connecting together two elements of a circuit corresponding to two different types of coupling device.

BRIEF DESCRIPTION OF THE DRAWINGS

Other characteristics and advantages of the invention appear on reading the following description of a particular and non-limiting embodiment of the invention.

Reference is made to the accompanying drawings, in which:

FIGS. 1, 2, 3, and 4 are fragmentary diagrammatic longitudinal section views of a coupling device of the invention showing various stages in coupling the endpiece in the female portion of the device; and FIGS. 5 and 6 are views analogous to the preceding views, showing a coupling device provided with two types of disconnection member.

MORE DETAILED DESCRIPTION

The present invention is described below with reference to the figures in a particular application to an adaptor given overall reference 1 enabling a male tubular endpiece given overall reference 2 and corresponding to a first type of coupling, to be coupled with a female portion (not shown) corresponding to a second type of coupling.

The male endpiece 2 is tubular in shape and has a free end portion 3 provided on the outside with an annular bead 4 laterally defined by front and rear surfaces 5 and 6 of frustoconical shape. The terms "front" and "rear" are used relative to the direction in which the male endpiece 2 is inserted in the female portion 7.

The adaptor 1 has a female portion given overall reference 7 which is arranged to receive the male endpiece 2 and which is described in greater detail below, and a tubular male portion 8 having, in this case, a free end portion 9 provided on the outside with an annular bead 10, which end portion and bead are arranged to be received in the female portion of the second type, not shown in the figures.

It can be seen in the figures that the male endpiece 2 of the first type and the male portion 8 of the second type differ from each other in particular in the lengths of their end portions 3 and 9 and in the shapes of their annular beads 4 and 10. These differences make a male endpiece of the first incompatible with a female portion of the second type, and vice versa, such that coupling them together requires the adaptor 1 to be interposed between them.

The female portion 7 has three successive cylindrical chambers 11, 12, and 13 of diameter increasing going away from the male portion 8 to the free end of the female portion 7.

The chamber 11 adjacent to the male portion 8 is of diameter substantially equal to the outside diameter of the end portion 3 of the endpiece 2.

A sealing ring 14 is received in the chamber 12 against the end wall 15 thereof. The sealing ring 14 is toroidal in shape with an inside diameter that is slightly smaller than the outside diameter of the end portion 3 of the endpiece 3.

The coupling device of the invention further comprises a bushing 16 having two opposite ends 17 and 18. The outside diameter of the bushing 16 is slightly smaller than the diameter of the chamber 13 and its inside diameter is slightly greater than the outside diameter of the annular bead 4 and of a guide portion 19 of the endpiece 2 which is placed beside the rear surface 6 of the annular bead 4.

The bushing 16 has front abutment means and rear abutment means which are secured to the end 17.

The front abutment means carry rigid tabs 20 extending the bushing 16 axially and regularly spaced apart from one another (e.g. three rigid tabs at 120° intervals or four rigid tabs at 90° intervals from one another). Each rigid tab 20 has one end secured to the end 17 of the bushing 16 and an opposite end provided with a lug 21 projecting towards the inside of the bushing 16 and presenting a shoulder 22 with a frustoconically-shaped surface matching the front surface 5 of the annular bead 4 of the male endpiece 2. The rigid tabs 20 have inside surfaces extending in register with the inside surface of the bushing 16, and outside surfaces forming cylindrical portions with a diameter substantially equal to the diameter of the chamber 12. The lugs 21 define a through section of diameter slightly greater than the diameter of the end portion 3 of the male endpiece 2.

The rear abutment means have deformable tabs 24 parallel to the rigid tabs 20 and interposed between them. Each deformable tab 24 has one end secured to the end 17 of the bushing 16, and a free opposite end provided with an inside lug 25 having an end surface 26 of shape that corresponds to the rear surface 6 of the annular bead 4 on the male endpiece 2. The length of the deformable tabs 24 is shorter than that of the rigid tabs 20. The difference in length is preferably such that the shoulders 22 of the rigid tabs 20 and the end surfaces 26 of the deformable tabs 24 define an annular housing of transverse dimensions substantially equal to the dimensions of the annular bead 4. The deformable tabs 24 can be moved by elastic deformation between a rest state in which the lugs 25 project into the inside of the bushing 16, and a deformed state in which the lugs 25 are retracted. The inside surfaces of the deformable tabs 24 lie in register with the inside surface of the bushing 16, and the outside surfaces of the deformable tabs 24 are in the form of a portion of a cylinder defining an outside diameter that is substantially equal to the diameter of the chamber 12.

The bushing 16 is mounted in the chamber 13 of the female portion 7 so as to slide between a pushed-in position where the free ends of the rigid tabs 20 and of the elastically deformable tabs 24 are received in the chamber 12, and a pulled-back position in which only the free ends of the rigid tabs 20 are received in the chamber 12 and the deformable tabs 24 extend in register with the chamber 13. While the free ends of the deformable tabs 24 are received in the chamber 12, the wall of the chamber 12 holds the deformable tabs 24 in their rest state, whereas while the deformable tabs 24 are in register with the chamber 13, they are free to be moved away from their rest state into their deformed state.

The bushing 16 is blocked in these pushed-in and pulled-back positions by the means for blocking the position of the bushing.

These means comprise catches 27 (e.g. three catches 27 at 120° intervals or four catches 27 at 90° intervals), which catches are secured to the end 18 of the bushing 16 and project to outside the female portion 7, running along the outside of the female portion 7. The catches 27 have respective curved ends 28 connected to the end 18, and opposite ends that are free and provided with respective inwardly-directed projections 29 each presenting a concave frustoconical end face 30 and an opposite radial face acting as an abutment shoulder 31.

For each catch 27, the female portion 7 is provided on the outside with two setbacks, a rear setback 32 and a front setback 33 located axially in succession and each presenting a convex frustoconical surface beside the male portion 8 and corresponding to the end face 30 of the catch 27, thereby forming a ramp, and beside the free end of the female portion 7 they present respective radial surfaces for co-operating with the shoulders 31 of the catches 27. The rear setbacks 32 serve to receive the projections 29 from the catches 27 when the bushing 16 is in its pulled-back position, while the front setbacks 33 serves to receive the projections 29 from the catches 27 when the bushing 16 is in its pushed-in position.

In the disconnected state, the bushing 16 is in its pulled-back position.

During connection, the male portion 2 is inserted into the female portion 7 and into the bushing 16 (FIG. 1).

The front surface 5 of the annular bead 4 then encounters the rear surfaces (opposite from the end surfaces 26) of the lugs 25 of the deformable tabs 24, and by means of a camming effect they cause the tabs 24 to deform so that the free ends are moved into the chamber 13 such that the lugs 25 of the deformable tabs 24 are retracted into said chamber 13, thereby allowing the annular bead 4 to go past (FIG. 2).

Once the annular bead 4 has gone past, the deformable tabs 24 return under their own elasticity into their rest state (FIG. 3).

The front surface 5 of the annular bead 4 then encounters the shoulders 22 of the rigid tabs 20 and entrains the bushing 16 towards its pushed-in position. The chamber 13 is connected to the chamber 12 via a chamfer so as to facilitate passing the ends of the deformable tabs 24 from the chamber 13 into the chamber 12 while the bushing 16 is being brought into its pushed-in position.

Simultaneously, the ramps of the rear setbacks 32 and the end faces 30 of the catches co-operate by camming so as to cause the projections 29 to become disengaged from the rear setbacks 32 by deforming the catches.

As the insertion movement continues, the end portion 3 of the endpiece 2 is engaged in the O-ring 14 and is finally received in the chamber 11.

The insertion movement is stopped when the curved ends 28 of the catches 27 come into abutment against the free end of the female portion 7. The bushing 16 is then in its pushed-in position and the projections 29 on the catches 27 are received in the front setbacks 33 (FIG. 4).

In this position, an extraction force exerted on the male endpiece 2 will cause the rear surface 6 of the annular bead 4 to press against the end surfaces 26 of the deformable tabs 24. Since the deformable tabs 24 are held in their projecting position by the wall of the chamber 12, they cannot lift, so the extraction force passes via the catches 27 to the shoulders 31 which come into abutment against the radial surfaces of the front setbacks 33. This prevents extraction of the male endpiece 2.

In order to disconnect the male endpiece 2 and the adaptor 1, it is necessary to apply traction to the male endpiece 2 while simultaneously lifting the catches 27 so as to disengage their projections 29 from the front setbacks 33.

Thereafter no further resistance is opposed to the extraction force so the male endpiece 2 moves backwards taking with it the bushing 16 by making contact with the end surfaces 26 of the deformable tabs 24 until the bushing 16 reaches its pulled-back position. The projections 29 on the catches 27 are then received in the rear setbacks 32 and oppose any further withdrawal of the bushing 16 beyond this position. The deformable tabs 24 then lie in register with the chamber 13, so co-operation between the rear surface 6 of the annular bead 4 and the end surfaces 26 of the lug 25 of the deformable tabs 24 causes these deformable tabs 24 to deform thus retracting the lugs 25. The endpiece 2 can thus continue to be withdrawn longitudinally.

In order to make it easier to lift the catches 27, a disconnection sleeve referenced 35 in FIG. 5 can be mounted on the adaptor 1, the sleeve having a convex frustoconical portion forming a ramp 35 for co-operating with the end faces 30 of the projections 29 on the catches 27, thereby lifting them by a camming action.

The disconnection sleeve 34 is made as a single piece threaded over the female portion 7 of the adaptor 1 after the male portion 8 has been disconnected.

The disconnection sleeve may also be implemented as two pieces that are free relative to each other or that are hinged to each other so as to enable it to be put into place on the female portion 7 without needing to extract the male portion 8 of the adaptor 1 from the female portion in which it is inserted.

With reference to FIG. 6, the disconnection sleeve 34 has a portion 36 extending around the ramp 35 and beyond it so as to cover the free ends of the catches 27 and so as to slide over them. The portion 36 has an inwardly-directed swelling and the free ends of the catches 27 have respective outwardly-directed swollen portions 38. The disconnection sleeve 34 thus slides over the female portion 7 and the catches 27. This sliding is limited at one end by the ramp 35 coming into abutment against the end surfaces 30 of the ends of the catches 27, and at the other end by the swollen portions 38 at the ends of the catches 27 coming into abutment against the portion 36. The disconnection sleeve 34 is made as a single piece in this example and it is mounted on the female portion 7 after being put into place on the catches 27 and prior to mounting the bushing 16 on the female portion 7.

It will be observed that the bushing 16 can easily be withdrawn from the female portion 7 by lifting the catches, and that it can subsequently be put back into place by snap-fastening. It is thus possible to make a set of adaptors with male portions corresponding respectively to various particular types of coupling and with female portions adapted to receive a plurality of types of male endpieces and with interchangeable bushings each adapted to a particular type of male endpiece. It is also possible to provide for the male portions to be connected to the female portions in removable manner so as to be completely interchangeable.

Naturally, the invention is not limited to the embodiment described and various embodiments can be provided without going beyond the ambit of the invention as defined by the claims.

The diameter of the chamber 12 can taper progressively towards the chamber 11 so as to deform the rigid tabs 19 to a small extent towards the inside of the female portion, thereby causing the male endpiece 2 to be held more securely.

In addition, the free ends of the rigid tabs 20 may have external swellings for co-operating with a shoulder in the chamber 12 so as to form an abutment against pushing in the bushing 16.

What is claimed is:

1. A coupling device for coupling an endpiece to a member, the coupling device comprising a female portion (7) for receiving the endpiece, and further comprising a bushing (16) mounted to slide in the female portion and possessing one end (18) projecting from the female portion which is provided on the outside with at least one blocking means (27) co-operating with the female portion to block the bushing either in a pushed-ins locking position or else in a pulled-back, unlocking position, and an opposite end (17) provided both with front abutment means (20) and rear abutment means for coming into abutment with an annular bead (4) of the endpiece (2), the front abutment means comprising at least one rigid tab (20) having one end secured to the bushing (16) and an opposite end (21) provided with a shoulder (22) projecting towards the inside of the bushing, the rear abutment means comprising at least one deformable tab (24) having one end secured to the bushing (16) and an opposite end provided with a lug (25) so that when the bushing is in its unlocking position, the deformable tab is in register with a first chamber (13) of the female portion so as to be deformable by the annular abutment between a rest state in which the lug projects towards the inside of the bushing and a deformed state in which the lug is retracted and when the bushing is in its locking position, the deformable tab is received in a second chamber (12) of the female portion having a wall that holds the deformable tab in his rest state.

2. A coupling device according to claim 1, wherein the lug (25) possesses chamfered front and rear faces (26).

3. A coupling device according to claim 1, wherein the blocking means comprise at least one elastically deformable catch (27) having one end secured to the bushing (16) and an opposite free end provided with a projection (29), and the female portion (7) has an outside surface presenting at least two setbacks (32, 33) in axial succession for receiving said projection.

4. A coupling device according to claim 3, wherein said projection (29) and at least the setback (32) corresponding to the bushing being in its pulled-back position present camming surfaces (30) for bringing the catch (27) from a first state in which its projection is received in the setback to a second state in which the projection is disengaged from said setback when the bushing is brought from its pulled-back position towards its pushed-in position, the projection having a rear abutment shoulder (31) for co-operating with corresponding surfaces of the setbacks (32, 33) for opposing extraction of the bushing (16).

5. A coupling device according to claim 3, including a disconnection sleeve (34) which is suitable for being mounted to slide coaxially over the female portion (7) and which possesses an annular ramp (35) for co-operating with the free ends of the catch as a lifting cam.

6. A coupling device according to claim 5, wherein the disconnection sleeve (34) is provided with means for snap-fastening on the catch (27) and on the female portion (7).

7. A device according to claim 1, wherein the bushing (16) is removably mounted on the female portion (7).

8. A coupling device for coupling an endpiece to a member, the coupling device comprising a female portion (7) for receiving the endpiece, and further comprising a bushing (16) mounted to slide in the female portion and possessing one end (18) projecting from the female portion which is provided on the outside with at least one blocking means (27) co-operating with the female portion to block the bushing either in a pushed-in, locking position or else in a pulled-back, unlocking position, and an opposite end (17) provided both with front abutment means (20) for coming into abutment with an annular bead (4) of the endpiece (2), which front abutment means project radially inwards from the bushing, and rear abutment means (24) for coming into abutment with the bead so that when the bushing is in its unlocking position, the rear abutment means are in register with a first chamber (13) of the female portion so as to be movable by the annular abutment between a position in which they project towards the inside of the bushing and a retracted position, and when the bushing is in its locking position, the rear abutment means are received in a second chamber (12) of the female portion having a wall that holds the rear abutment means in their projecting position, wherein the blocking means comprise at least one elastically deformable catch (27) having one end secured to the bushing (16) and an opposite free end provided with a projection (29), and the female portion (7) has an outside surface presenting at least two setbacks (32, 33) in axial succession for receiving said projection, including a disconnection sleeve (34) which is suitable for being mounted to slide coaxially over the female portion (7) and which possesses an annular ramp (35) for co-operating with the free ends of the catch as a lifting cm.

9. A coupling device according to claim 8, wherein the disconnection sleeve (34) is provided with means for snap-fastening on the catch (27) and on the female portion (7).

10. A device according to claim 8, wherein the bushing (16) is removably mounted on the female portion (7).

11. A coupling device according to claim 8, wherein said projection (29) and at least the setback (32) corresponding to the bushing being in its pulled-back position present camming surfaces (30) for bringing the catch (27) from a first state in which its projection is received in the setback to a second state in which the projection is disengaged from said setback when the bushing is brought from its pulled-back position towards its pushed-in position, the projection having a rear abutment shoulder (31) for co-operating with corresponding surfaces of the setbacks (32, 33) for opposing extraction of the bushing (16).

* * * * *